(12) United States Patent
Jacobson (10) Patent No.: US 8,085,993 B2
(45) Date of Patent: Dec. 27, 2011

(54) MODULAR BIOMETRICS COLLECTION SYSTEM ARCHITECTURE

(75) Inventor: Vincent C. Jacobson, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 1044 days.

(21) Appl. No.: 11/681,470

(22) Filed: Mar. 2, 2007

(65) Prior Publication Data

US 2007/0206840 A1 Sep. 6, 2007

Related U.S. Application Data

(60) Provisional application No. 60/778,770, filed on Mar. 3, 2006.

(51) Int. Cl.
*G06K 9/00* (2006.01)
(52) U.S. Cl. ............ 382/116; 382/117; 382/118
(58) Field of Classification Search ............ 382/116, 382/117, 118; 340/5.52, 5.53, 5.82, 5.83
See application file for complete search history.

(56) References Cited

U.S. PATENT DOCUMENTS

| | | |
|---|---|---|
| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsuhita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 6,005,704 A | 12/1999 | Chmielewski, Jr. et al. |

(Continued)

FOREIGN PATENT DOCUMENTS

EP  0484076  5/1992

(Continued)

OTHER PUBLICATIONS

Bonney et al., "Iris Pattern Extraction Using Bit Planes and Standard Deviations," IEEE, pp. 582-586, 2004.

(Continued)

*Primary Examiner* — Jon Chang
(74) *Attorney, Agent, or Firm* — Seager, Tufte & Wickhem LLC (57) ABSTRACT

A modular biometrics collection system with an architecture having application to a combined features recognition system. The system may be a self-organizing mesh of collaborative independent components. Each component may have inputs, outputs, and local prioritization management. Each component may operate autonomously. Federated behavior of the components may be achieved by subscribing to content that influences local prioritization. An example of the system may have application to combined face and iris recognition.

16 Claims, 3 Drawing Sheets

U.S. PATENT DOCUMENTS

| | | | |
|---|---|---|---|
| 6,007,202 | A | 12/1999 | Apple et al. |
| 6,012,376 | A | 1/2000 | Hanke et al. |
| 6,021,210 | A | 2/2000 | Camus et al. |
| 6,028,949 | A | 2/2000 | McKendall |
| 6,055,322 | A | 4/2000 | Salganicoff et al. |
| 6,064,752 | A | 5/2000 | Rozmus et al. |
| 6,069,967 | A | 5/2000 | Rozmus et al. |
| 6,081,607 | A | 6/2000 | Mori et al. |
| 6,088,470 | A | 7/2000 | Camus et al. |
| 6,091,899 | A | 7/2000 | Konishi et al. |
| 6,101,477 | A | 8/2000 | Hohle et al. |
| 6,104,431 | A | 8/2000 | Inoue et al. |
| 6,108,636 | A | 8/2000 | Yap et al. |
| 6,119,096 | A | 9/2000 | Mann et al. |
| 6,120,461 | A | 9/2000 | Smyth |
| 6,134,339 | A | 10/2000 | Luo |
| 6,144,754 | A | 11/2000 | Okano et al. |
| 6,246,751 | B1 | 6/2001 | Bergl et al. |
| 6,247,813 | B1 | 6/2001 | Kim et al. |
| 6,252,977 | B1 | 6/2001 | Salganicoff et al. |
| 6,282,475 | B1 | 8/2001 | Washington |
| 6,285,505 | B1 | 9/2001 | Melville et al. |
| 6,285,780 | B1 | 9/2001 | Yamakita et al. |
| 6,289,113 | B1 | 9/2001 | McHugh et al. |
| 6,299,306 | B1 | 10/2001 | Braithwaite et al. |
| 6,308,015 | B1 | 10/2001 | Matsumoto |
| 6,309,069 | B1 | 10/2001 | Seal et al. |
| 6,320,610 | B1 | 11/2001 | Van Sant et al. |
| 6,320,612 | B1 | 11/2001 | Young |
| 6,320,973 | B2 | 11/2001 | Suzaki et al. |
| 6,323,761 | B1 | 11/2001 | Son |
| 6,325,765 | B1 | 12/2001 | Hay et al. |
| 6,330,674 | B1 | 12/2001 | Angelo et al. |
| 6,332,193 | B1 | 12/2001 | Glass et al. |
| 6,344,683 | B1 | 2/2002 | Kim |
| 6,370,260 | B1 | 4/2002 | Pavlidis et al. |
| 6,377,699 | B1 | 4/2002 | Musgrave et al. |
| 6,393,136 | B1 | 5/2002 | Amir et al. |
| 6,400,835 | B1 | 6/2002 | Lemelson et al. |
| 6,424,727 | B1 | 7/2002 | Musgrave et al. |
| 6,424,845 | B1 | 7/2002 | Emmoft et al. |
| 6,433,818 | B1 | 8/2002 | Steinberg et al. |
| 6,438,752 | B1 | 8/2002 | McClard |
| 6,441,482 | B1 | 8/2002 | Foster |
| 6,446,045 | B1 | 9/2002 | Stone et al. |
| 6,483,930 | B1 | 11/2002 | Musgrave et al. |
| 6,484,936 | B1 | 11/2002 | Nicoll et al. |
| 6,490,443 | B1 | 12/2002 | Freeny, Jr. |
| 6,493,669 | B1 | 12/2002 | Curry et al. |
| 6,494,363 | B1 | 12/2002 | Roger et al. |
| 6,503,163 | B1 | 1/2003 | Van Sant et al. |
| 6,505,193 | B1 | 1/2003 | Musgrave et al. |
| 6,506,078 | B1 | 1/2003 | Mori et al. |
| 6,508,397 | B1 | 1/2003 | Do |
| 6,516,078 | B1 | 2/2003 | Yang et al. |
| 6,516,087 | B1 | 2/2003 | Camus |
| 6,516,416 | B2 | 2/2003 | Gregg et al. |
| 6,522,772 | B1 | 2/2003 | Morrison et al. |
| 6,523,165 | B2 | 2/2003 | Liu et al. |
| 6,526,160 | B1 | 2/2003 | Ito |
| 6,532,298 | B1 | 3/2003 | Cambier et al. |
| 6,540,392 | B1 | 4/2003 | Braithwaite |
| 6,542,624 | B1 | 4/2003 | Oda |
| 6,546,121 | B1 | 4/2003 | Oda |
| 6,553,494 | B1 | 4/2003 | Glass |
| 6,580,356 | B1 | 6/2003 | Alt et al. |
| 6,591,001 | B1 | 7/2003 | Oda et al. |
| 6,591,064 | B2 | 7/2003 | Higashiyama et al. |
| 6,594,377 | B1 | 7/2003 | Kim et al. |
| 6,594,399 | B1 | 7/2003 | Camus et al. |
| 6,598,971 | B2 | 7/2003 | Cleveland |
| 6,600,878 | B2 | 7/2003 | Pregara |
| 6,614,919 | B1 | 9/2003 | Suzaki et al. |
| 6,652,099 | B2 | 11/2003 | Chae et al. |
| 6,674,367 | B2 | 1/2004 | Sweatte |
| 6,690,997 | B2 | 2/2004 | Rivalto |
| 6,708,176 | B2 | 3/2004 | Strunk et al. |
| 6,711,562 | B1 | 3/2004 | Ross et al. |
| 6,714,665 | B1 | 3/2004 | Hanna et al. |
| 6,718,049 | B2 | 4/2004 | Pavlidis et al. |
| 6,718,665 | B2 | 4/2004 | Hess et al. |
| 6,732,278 | B2 | 5/2004 | Baird, III et al. |
| 6,734,783 | B1 | 5/2004 | Anbai |
| 6,745,520 | B2 | 6/2004 | Puskaric et al. |
| 6,750,435 | B2 | 6/2004 | Ford |
| 6,751,733 | B1 | 6/2004 | Nakamura et al. |
| 6,753,919 | B1 | 6/2004 | Daugman |
| 6,754,640 | B2 | 6/2004 | Bozeman |
| 6,760,467 | B1 | 7/2004 | Min et al. |
| 6,765,470 | B2 | 7/2004 | Shinzaki |
| 6,766,041 | B2 | 7/2004 | Golden et al. |
| 6,775,774 | B1 | 8/2004 | Harper |
| 6,785,406 | B1 | 8/2004 | Kamada |
| 6,793,134 | B2 | 9/2004 | Clark |
| 6,819,219 | B1 | 11/2004 | Bolle et al. |
| 6,829,370 | B1 | 12/2004 | Pavlidis et al. |
| 6,832,044 | B2 | 12/2004 | Doi et al. |
| 6,836,554 | B1 | 12/2004 | Bolle et al. |
| 6,837,436 | B2 | 1/2005 | Swartz et al. |
| 6,845,879 | B2 | 1/2005 | Park |
| 6,853,444 | B2 | 2/2005 | Haddad |
| 6,867,683 | B2 | 3/2005 | Calvesio et al. |
| 6,873,960 | B1 | 3/2005 | Wood et al. |
| 6,896,187 | B2 | 5/2005 | Stockhammer |
| 6,905,411 | B2 | 6/2005 | Nguyen et al. |
| 6,920,237 | B2 | 7/2005 | Chen et al. |
| 6,930,707 | B2 | 8/2005 | Bates et al. |
| 6,934,849 | B2 | 8/2005 | Kramer et al. |
| 6,950,139 | B2 | 9/2005 | Fujinawa |
| 6,954,738 | B2 | 10/2005 | Wang et al. |
| 6,957,341 | B2 | 10/2005 | Rice et al. |
| 6,972,797 | B2 | 12/2005 | Izumi |
| 6,992,562 | B2 | 1/2006 | Fuks et al. |
| 7,053,948 | B2 | 5/2006 | Konishi |
| 7,071,971 | B2 | 7/2006 | Elberbaum |
| 7,084,904 | B2 | 8/2006 | Liu et al. |
| 7,136,581 | B2 | 11/2006 | Fujii |
| 7,183,895 | B2 | 2/2007 | Bazakos et al. |
| 7,184,577 | B2 | 2/2007 | Chen et al. |
| 7,197,173 | B2 | 3/2007 | Jones et al. |
| 7,204,425 | B2 | 4/2007 | Mosher, Jr. et al. |
| 7,277,561 | B2 | 10/2007 | Shin |
| 7,277,891 | B2 | 10/2007 | Howard et al. |
| 7,298,873 | B2 * | 11/2007 | Miller et al. .................. 382/116 |
| 7,315,233 | B2 | 1/2008 | Yuhara |
| 7,362,210 | B2 | 4/2008 | Bazakos et al. |
| 7,362,370 | B2 | 4/2008 | Sakamoto et al. |
| 7,365,771 | B2 | 4/2008 | Kahn et al. |
| 7,406,184 | B2 | 7/2008 | Wolff et al. |
| 7,414,648 | B2 | 8/2008 | Imada |
| 7,417,682 | B2 | 8/2008 | Kuwakino et al. |
| 7,418,115 | B2 | 8/2008 | Northcott et al. |
| 7,421,097 | B2 | 9/2008 | Hamza et al. |
| 7,443,441 | B2 | 10/2008 | Hiraoka |
| 7,460,693 | B2 | 12/2008 | Loy et al. |
| 7,471,451 | B2 | 12/2008 | Dent et al. |
| 7,486,806 | B2 | 2/2009 | Azuma et al. |
| 7,518,651 | B2 | 4/2009 | Butterworth |
| 7,537,568 | B2 | 5/2009 | Moehring |
| 7,538,326 | B2 | 5/2009 | Johnson et al. |
| 7,542,945 | B2 | 6/2009 | Thompson et al. |
| 7,580,620 | B2 | 8/2009 | Raskar et al. |
| 7,593,550 | B2 | 9/2009 | Hamza |
| 7,722,461 | B2 | 5/2010 | Gatto et al. |
| 7,751,598 | B2 | 7/2010 | Matey et al. |
| 7,756,301 | B2 | 7/2010 | Hamza |
| 7,756,407 | B2 | 7/2010 | Raskar |
| 7,761,453 | B2 | 7/2010 | Hamza |
| 7,777,802 | B2 | 8/2010 | Shinohara et al. |
| 7,804,982 | B2 | 9/2010 | Howard et al. |
| 2001/0026632 | A1 | 10/2001 | Tamai |
| 2001/0027116 | A1 | 10/2001 | Baird |
| 2001/0047479 | A1 | 11/2001 | Bromba et al. |
| 2001/0051924 | A1 | 12/2001 | Uberti |
| 2001/0054154 | A1 | 12/2001 | Tam |
| 2002/0010857 | A1 | 1/2002 | Karthik |
| 2002/0033896 | A1 | 3/2002 | Hatano |

| | | | | | | |
|---|---|---|---|---|---|---|
| 2002/0039433 A1 | 4/2002 | Shin | | 2003/0159051 A1 | 8/2003 | Hollnagel |
| 2002/0040434 A1 | 4/2002 | Elliston et al. | | 2003/0163739 A1 | 8/2003 | Armington et al. |
| 2002/0062280 A1 | 5/2002 | Zachariassen et al. | | 2003/0169334 A1 | 9/2003 | Braithwaite et al. |
| 2002/0077841 A1 | 6/2002 | Thompson | | 2003/0169901 A1 | 9/2003 | Pavlidis et al. |
| 2002/0089157 A1 | 7/2002 | Breed et al. | | 2003/0169907 A1 | 9/2003 | Edwards et al. |
| 2002/0106113 A1 | 8/2002 | Park | | 2003/0173408 A1 | 9/2003 | Mosher, Jr. et al. |
| 2002/0112177 A1 | 8/2002 | Voltmer et al. | | 2003/0174049 A1 | 9/2003 | Beigel et al. |
| 2002/0114495 A1 | 8/2002 | Chen et al. | | 2003/0177051 A1 | 9/2003 | Driscoll et al. |
| 2002/0130961 A1 | 9/2002 | Lee et al. | | 2003/0182151 A1 | 9/2003 | Taslitz |
| 2002/0131622 A1 | 9/2002 | Lee et al. | | 2003/0182182 A1 | 9/2003 | Kocher |
| 2002/0139842 A1 | 10/2002 | Swaine | | 2003/0189480 A1 | 10/2003 | Hamid |
| 2002/0140715 A1 | 10/2002 | Smet | | 2003/0189481 A1 | 10/2003 | Hamid |
| 2002/0142844 A1 | 10/2002 | Kerr | | 2003/0191949 A1 | 10/2003 | Odagawa |
| 2002/0144128 A1 | 10/2002 | Rahman et al. | | 2003/0194112 A1 | 10/2003 | Lee |
| 2002/0150281 A1 | 10/2002 | Cho | | 2003/0195935 A1 | 10/2003 | Leeper |
| 2002/0154794 A1 | 10/2002 | Cho | | 2003/0198368 A1 | 10/2003 | Kee |
| 2002/0158750 A1 | 10/2002 | Almalik | | 2003/0200180 A1 | 10/2003 | Phelan, III et al. |
| 2002/0164054 A1 | 11/2002 | McCartney et al. | | 2003/0210139 A1 | 11/2003 | Brooks et al. |
| 2002/0175182 A1 | 11/2002 | Matthews | | 2003/0210802 A1 | 11/2003 | Schuessier |
| 2002/0186131 A1 | 12/2002 | Fettis | | 2003/0218719 A1 | 11/2003 | Abourizk et al. |
| 2002/0191075 A1 | 12/2002 | Doi et al. | | 2003/0225711 A1 | 12/2003 | Paping |
| 2002/0191076 A1 | 12/2002 | Wada et al. | | 2003/0228898 A1 | 12/2003 | Rowe |
| 2002/0194128 A1 | 12/2002 | Maritzen et al. | | 2003/0233556 A1 | 12/2003 | Angelo et al. |
| 2002/0194131 A1 | 12/2002 | Dick | | 2003/0235326 A1 | 12/2003 | Morikawa et al. |
| 2002/0198731 A1 | 12/2002 | Barnes et al. | | 2003/0235411 A1 | 12/2003 | Morikawa et al. |
| 2003/0002714 A1 | 1/2003 | Wakiyama | | 2003/0236120 A1 | 12/2003 | Reece et al. |
| 2003/0012413 A1 | 1/2003 | Kusakari et al. | | 2004/0001614 A1 | 1/2004 | Russon et al. |
| 2003/0014372 A1 | 1/2003 | Wheeler et al. | | 2004/0002894 A1 | 1/2004 | Kocher |
| 2003/0020828 A1 | 1/2003 | Ooi et al. | | 2004/0005078 A1 | 1/2004 | Tillotson |
| 2003/0038173 A1 | 2/2003 | Blackson et al. | | 2004/0006553 A1 | 1/2004 | de Vries et al. |
| 2003/0046228 A1 | 3/2003 | Berney | | 2004/0010462 A1 | 1/2004 | Moon et al. |
| 2003/0053663 A1 | 3/2003 | Chen et al. | | 2004/0012760 A1 | 1/2004 | Mihashi et al. |
| 2003/0055689 A1 | 3/2003 | Block et al. | | 2004/0019570 A1 | 1/2004 | Bolle et al. |
| 2003/0055787 A1 | 3/2003 | Fujii | | 2004/0023664 A1 | 2/2004 | Mirouze et al. |
| 2003/0058492 A1 | 3/2003 | Wakiyama | | 2004/0023709 A1 | 2/2004 | Beaulieu et al. |
| 2003/0061172 A1 | 3/2003 | Robinson | | 2004/0025030 A1 | 2/2004 | Corbett-Clark et al. |
| 2003/0061233 A1 | 3/2003 | Manasse et al. | | 2004/0025031 A1 | 2/2004 | Ooi et al. |
| 2003/0065626 A1 | 4/2003 | Allen | | 2004/0025053 A1 | 2/2004 | Hayward |
| 2003/0071743 A1 | 4/2003 | Seah et al. | | 2004/0029564 A1 | 2/2004 | Hodge |
| 2003/0072475 A1 | 4/2003 | Tamori | | 2004/0030930 A1 | 2/2004 | Nomura |
| 2003/0073499 A1 | 4/2003 | Reece | | 2004/0035123 A1 | 2/2004 | Kim et al. |
| 2003/0074317 A1 | 4/2003 | Hofi | | 2004/0037450 A1 | 2/2004 | Bradski |
| 2003/0074326 A1 | 4/2003 | Byers | | 2004/0039914 A1 | 2/2004 | Barr et al. |
| 2003/0076161 A1 | 4/2003 | Tisse | | 2004/0042641 A1 | 3/2004 | Jakubowski |
| 2003/0076300 A1 | 4/2003 | Lauper et al. | | 2004/0044627 A1 | 3/2004 | Russell et al. |
| 2003/0076984 A1 | 4/2003 | Tisse et al. | | 2004/0046640 A1 | 3/2004 | Jourdain et al. |
| 2003/0080194 A1 | 5/2003 | O'Hara et al. | | 2004/0049687 A1 | 3/2004 | Orsini et al. |
| 2003/0091215 A1 | 5/2003 | Lauper et al. | | 2004/0050924 A1 | 3/2004 | Mletzko et al. |
| 2003/0092489 A1 | 5/2003 | Veradej | | 2004/0050930 A1 | 3/2004 | Rowe |
| 2003/0095689 A1 | 5/2003 | Volkommer et al. | | 2004/0052405 A1 | 3/2004 | Walfridsson |
| 2003/0098776 A1 | 5/2003 | Friedli | | 2004/0052418 A1 | 3/2004 | DeLean |
| 2003/0099379 A1 | 5/2003 | Monk et al. | | 2004/0059590 A1 | 3/2004 | Mercredi et al. |
| 2003/0099381 A1 | 5/2003 | Ohba | | 2004/0059953 A1 | 3/2004 | Purnell |
| 2003/0103652 A1 | 6/2003 | Lee et al. | | 2004/0104266 A1 | 6/2004 | Bolle et al. |
| 2003/0107097 A1 | 6/2003 | McArthur et al. | | 2004/0117636 A1 | 6/2004 | Cheng |
| 2003/0107645 A1 | 6/2003 | Yoon | | 2004/0133804 A1 | 7/2004 | Smith et al. |
| 2003/0108224 A1 | 6/2003 | Ike | | 2004/0146187 A1 | 7/2004 | Jeng |
| 2003/0108225 A1 | 6/2003 | Li | | 2004/0148526 A1 | 7/2004 | Sands et al. |
| 2003/0115148 A1 | 6/2003 | Takhar | | 2004/0160518 A1 | 8/2004 | Park |
| 2003/0115459 A1 | 6/2003 | Monk | | 2004/0162870 A1 | 8/2004 | Matsuzaki et al. |
| 2003/0116630 A1 | 6/2003 | Carey et al. | | 2004/0162984 A1 | 8/2004 | Freeman et al. |
| 2003/0118212 A1 | 6/2003 | Min et al. | | 2004/0169817 A1 | 9/2004 | Grotehusmann et al. |
| 2003/0118217 A1 | 6/2003 | Kondo et al. | | 2004/0172541 A1 | 9/2004 | Ando et al. |
| 2003/0123711 A1 | 7/2003 | Kim et al. | | 2004/0174070 A1 | 9/2004 | Voda et al. |
| 2003/0125054 A1 | 7/2003 | Garcia | | 2004/0190759 A1 | 9/2004 | Caldwell |
| 2003/0125057 A1 | 7/2003 | Pesola | | 2004/0193893 A1 | 9/2004 | Braithwaite et al. |
| 2003/0126560 A1 | 7/2003 | Kurapati et al. | | 2004/0219902 A1 | 11/2004 | Lee et al. |
| 2003/0131245 A1 | 7/2003 | Linderman | | 2004/0233038 A1 | 11/2004 | Beenau et al. |
| 2003/0131265 A1 | 7/2003 | Bhakta | | 2004/0240711 A1 | 12/2004 | Hamza et al. |
| 2003/0133597 A1 | 7/2003 | Moore et al. | | 2004/0252866 A1 | 12/2004 | Tisse et al. |
| 2003/0140235 A1 | 7/2003 | Immega et al. | | 2004/0255168 A1 | 12/2004 | Murashita et al. |
| 2003/0140928 A1 | 7/2003 | Bui et al. | | 2005/0008200 A1 | 1/2005 | Azuma et al. |
| 2003/0141411 A1 | 7/2003 | Pandya et al. | | 2005/0008201 A1 | 1/2005 | Lee et al. |
| 2003/0149881 A1 | 8/2003 | Patel et al. | | 2005/0012817 A1 | 1/2005 | Hampapur et al. |
| 2003/0152251 A1 | 8/2003 | Ike | | 2005/0029353 A1 | 2/2005 | Isemura et al. |
| 2003/0152252 A1 | 8/2003 | Kondo et al. | | 2005/0052566 A1 | 3/2005 | Kato |
| 2003/0156741 A1 | 8/2003 | Lee et al. | | 2005/0055582 A1 | 3/2005 | Bazakos et al. |
| 2003/0158762 A1 | 8/2003 | Wu | | 2005/0063567 A1 | 3/2005 | Saitoh et al. |
| 2003/0158821 A1 | 8/2003 | Maia | | 2005/0084137 A1 | 4/2005 | Kim et al. |

| Pub. No. | Date | Inventor |
|---|---|---|
| 2005/0084179 A1 | 4/2005 | Hanna et al. |
| 2005/0099288 A1 | 5/2005 | Spitz et al. |
| 2005/0102502 A1 | 5/2005 | Sagen |
| 2005/0110610 A1 | 5/2005 | Bazakos et al. |
| 2005/0125258 A1 | 6/2005 | Yellin et al. |
| 2005/0127161 A1 | 6/2005 | Smith et al. |
| 2005/0129286 A1 | 6/2005 | Hekimian |
| 2005/0134796 A1 | 6/2005 | Zelvin et al. |
| 2005/0138385 A1 | 6/2005 | Friedli et al. |
| 2005/0138387 A1 | 6/2005 | Lam et al. |
| 2005/0146640 A1 | 7/2005 | Shibata |
| 2005/0151620 A1 | 7/2005 | Neumann |
| 2005/0152583 A1 | 7/2005 | Kondo et al. |
| 2005/0193212 A1 | 9/2005 | Yuhara |
| 2005/0199708 A1 | 9/2005 | Friedman |
| 2005/0206501 A1 | 9/2005 | Farhat |
| 2005/0206502 A1 | 9/2005 | Bernitz |
| 2005/0207614 A1 | 9/2005 | Schonberg et al. |
| 2005/0210267 A1 | 9/2005 | Sugano et al. |
| 2005/0210270 A1 | 9/2005 | Rohatgi et al. |
| 2005/0210271 A1 | 9/2005 | Chou et al. |
| 2005/0212654 A1* | 9/2005 | Yoda ............................ 340/5.53 |
| 2005/0238214 A1 | 10/2005 | Matsuda et al. |
| 2005/0240778 A1 | 10/2005 | Saito |
| 2005/0248725 A1 | 11/2005 | Ikoma et al. |
| 2005/0249385 A1 | 11/2005 | Kondo et al. |
| 2005/0255840 A1 | 11/2005 | Markham |
| 2006/0093190 A1* | 5/2006 | Cheng et al. ................... 382/115 |
| 2006/0147094 A1 | 7/2006 | Yoo |
| 2006/0165266 A1 | 7/2006 | Hamza |
| 2006/0210119 A1* | 9/2006 | Willis et al. ................... 382/115 |
| 2006/0274919 A1 | 12/2006 | LoIacono et al. |
| 2007/0036397 A1 | 2/2007 | Hamza |
| 2007/0140531 A1 | 6/2007 | Hamza |
| 2007/0160266 A1 | 7/2007 | Jones et al. |
| 2007/0189582 A1 | 8/2007 | Hamza |
| 2007/0211924 A1 | 9/2007 | Hamza |
| 2007/0274570 A1 | 11/2007 | Hamza |
| 2007/0274571 A1 | 11/2007 | Hamza |
| 2007/0286590 A1 | 12/2007 | Terashima |
| 2008/0005578 A1 | 1/2008 | Shafir |
| 2008/0075334 A1 | 3/2008 | Determan et al. |
| 2008/0075441 A1 | 3/2008 | Jelinek et al. |
| 2008/0104415 A1 | 5/2008 | Palti-Wasserman et al. |
| 2008/0148030 A1 | 6/2008 | Goffin |
| 2008/0211347 A1 | 9/2008 | Wright et al. |
| 2008/0252412 A1 | 10/2008 | Larsson et al. |
| 2008/0267456 A1 | 10/2008 | Anderson |
| 2009/0046899 A1 | 2/2009 | Northcott et al. |
| 2009/0092283 A1 | 4/2009 | Whillock et al. |
| 2009/0316993 A1 | 12/2009 | Brasnett et al. |
| 2010/0002913 A1 | 1/2010 | Hamza |
| 2010/0033677 A1 | 2/2010 | Jelinek |
| 2010/0034529 A1 | 2/2010 | Jelinek |
| 2010/0142765 A1 | 6/2010 | Hamza |
| 2010/0182440 A1 | 7/2010 | McCloskey |
| 2010/0239119 A1 | 9/2010 | Bazakos et al. |

FOREIGN PATENT DOCUMENTS

| | | |
|---|---|---|
| EP | 0593386 | 4/1994 |
| EP | 0878780 | 11/1998 |
| EP | 0899680 | 3/1999 |
| EP | 0910986 | 4/1999 |
| EP | 0962894 | 12/1999 |
| EP | 1018297 | 7/2000 |
| EP | 1024463 | 8/2000 |
| EP | 1028398 | 8/2000 |
| EP | 1041506 | 10/2000 |
| EP | 1041523 | 10/2000 |
| EP | 1126403 | 8/2001 |
| EP | 1139270 | 10/2001 |
| EP | 1237117 | 9/2002 |
| EP | 1477925 | 11/2004 |
| EP | 1635307 | 3/2006 |
| GB | 2369205 | 5/2002 |
| GB | 2371396 | 7/2002 |
| GB | 2375913 | 11/2002 |
| GB | 2402840 | 12/2004 |
| GB | 2411980 | 9/2005 |
| JP | 9161135 | 6/1997 |
| JP | 9198545 | 7/1997 |
| JP | 9201348 | 8/1997 |
| JP | 9147233 | 9/1997 |
| JP | 9234264 | 9/1997 |
| JP | 9305765 | 11/1997 |
| JP | 9319927 | 12/1997 |
| JP | 10021392 | 1/1998 |
| JP | 10040386 | 2/1998 |
| JP | 10049728 | 2/1998 |
| JP | 10137219 | 5/1998 |
| JP | 10137221 | 5/1998 |
| JP | 10137221 A * | 5/1998 |
| JP | 10137222 | 5/1998 |
| JP | 10137223 | 5/1998 |
| JP | 10248827 | 9/1998 |
| JP | 10269183 | 10/1998 |
| JP | 11047117 | 2/1999 |
| JP | 11089820 | 4/1999 |
| JP | 11200684 | 7/1999 |
| JP | 11203478 | 7/1999 |
| JP | 11213047 | 8/1999 |
| JP | 11339037 | 12/1999 |
| JP | 2000005149 | 1/2000 |
| JP | 2000005150 | 1/2000 |
| JP | 2000011163 | 1/2000 |
| JP | 2000023946 | 1/2000 |
| JP | 2000083930 | 3/2000 |
| JP | 2000102510 | 4/2000 |
| JP | 2000102524 | 4/2000 |
| JP | 2000105830 | 4/2000 |
| JP | 2000107156 | 4/2000 |
| JP | 2000139878 | 5/2000 |
| JP | 2000155863 | 6/2000 |
| JP | 2000182050 | 6/2000 |
| JP | 2000185031 | 7/2000 |
| JP | 2000194972 | 7/2000 |
| JP | 2000237167 | 9/2000 |
| JP | 2000242788 | 9/2000 |
| JP | 2000259817 | 9/2000 |
| JP | 2000356059 | 12/2000 |
| JP | 2000357232 | 12/2000 |
| JP | 2001005948 | 1/2001 |
| JP | 2001067399 | 3/2001 |
| JP | 2001101429 | 4/2001 |
| JP | 2001167275 | 6/2001 |
| JP | 2001222661 | 8/2001 |
| JP | 2001292981 | 10/2001 |
| JP | 2001297177 | 10/2001 |
| JP | 2001358987 | 12/2001 |
| JP | 2002119477 | 4/2002 |
| JP | 2002133415 | 5/2002 |
| JP | 2002153444 | 5/2002 |
| JP | 2002153445 | 5/2002 |
| JP | 2002260071 | 9/2002 |
| JP | 2002271689 | 9/2002 |
| JP | 2002286650 | 10/2002 |
| JP | 2002312772 | 10/2002 |
| JP | 2002329204 | 11/2002 |
| JP | 2003006628 | 1/2003 |
| JP | 2003036434 | 2/2003 |
| JP | 2003108720 | 4/2003 |
| JP | 2003108983 | 4/2003 |
| JP | 2003132355 | 5/2003 |
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |

| | | |
|---|---|---|
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 A * | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | 2006012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Camus et al., "Reliable and Fast Eye Finding in Close-up Images," IEEE, pp. 389-394, 2002.
Cui et al., "A Fast and Robust Iris Localization Method Based on Texture Segmentation," 8 pages, 2004.
Cui et al., "An Appearance-Based Method for Iris Detection," 6 pages, 2004.
Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.
Cui et al., "An Iris Image Synthesis Method Based on PCA and Super-Resolution," IEEE Computer Society, Proceedings of the 17th International Conference on Pattern Recognition, 6 pages, Aug. 23-26, 2004.
Cui et al., "An Iris Recognition Algorithm Using Local Extreme Points," Biometric Authentication, First International Conference, ICBA 2004, Hong Kong, China, 10 pages, Jul. 15-17, 2004.
Daugman, "Results From 200 Billion Iris Cross-Comparisons," University of Cambridge Computer Laboratory, Technical Report, No. 635, 8 pages, Jun. 2005.
Du et al., "A One-Dimensional Approach for Iris Identification," 11 pages, prior to Jan. 25, 2006.
http://www.newscientisttech.com/article/dn11110-invention-covert-iris-sc, "Invention: Covert Iris Scanner," 3 pages, printed Feb. 8, 2007.
Huang et al., "Iris Model Based On Local Orientation Description," 5 pages, prior to Jan. 25, 2006.
Huang et al., "An Efficient Iris Recognition System," IEEE Proceedings of the First International Conference on Machine Learning and Cybernetics, Beijing, pp. 450-454, Nov. 4-5, 2002.
Ma et al., "Personal Identification Based On Iris Texture Analysis," IEEE Transactions on Pattern Analysis and Machine Intelligence, vol. 25, No. 12, pp. 1519-1533, Dec. 2003.
Masek, "Recognition of Human Iris Patterns for Biometric Identification," 61 pages, 2003.
Sun et al., "Robust Encoding of Local Ordinal Measures: A General Framework of Iris Recognition," 13 pages, prior to Jan. 25, 2006.
Avcibas et al., "Steganalysis Using Image Quality Metrics," IEEE Transactions on Image Processing, vol. 12, No. 2, pp. 221-229, Feb. 2003.
Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.
Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Daugman, "How Iris Recognition Works," IEEE 2002 International Conference on Image Processing, vol. I of III, 6 pages, Sep. 22-25, 2002.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.
Jalaja et al., "Texture Element Feature Characterizations for CBIR," IEEE, pp. 733-736, 2005.
Kalka et al., "Image Quality Assessment for Iris Biometric," Proc. Of SPIE vol. 6202 62020D, 11 pages, 2006.

Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.

Lau et al., "Finding a Small Number of Regions in an Image Using Low-Level Features," Pattern Recognition 35, pp. 2323-2339, 2002.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Oppenheim et al, "The Importance of Phase in Signals," Proceedings of the IEEE, vol. 69, No. 5, pp. 529-541, 1981.

Ratha et al., "A Real-Time Matching System for Large Fingerprint Databases," IEEE Transactions on Pattern Analysis, and Machine Intelligence, vol. 18, No. 8, pp. 799-812, Aug. 1996.

Sony, "Network Color Camera, SNC-RZ30N (NTSC)," 6 pages, Aug. 2002.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

Hampapur et al., "Smart Surveillance: Applications, Technologies and Implications," IEEE, pp. 1133-1138, 2003.

Wang et al., "Recent developments in human motion analysis," Pattern Recognition 36, pp. 585-601, 2003.

AOptix Technologies, "Introducing the AOptix InSight 2 Meter Iris Recognition System," 6 pages, 2010.

Belhumeur et al., "Eigenfaces Vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, 595-659, 1999.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Chen et al., "Localized Iris Image Quality Using 2-D Wavelets," LNCS vol. 3832, pp. 373-381, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,232, filed Jun. 11, 2010.

U.S. Appl. No. 12/814,272, filed Jun. 11, 2010.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and Its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5$^{th}$ International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ross et al., "Segmenting Non-Ideal Irises Using Geodesic Active Contours," IEEE 2006 Biometrics Symposium, 3 pages, 2006.

Shapiro et al., "Pages 556-559 in Book Entitled Computer Vision," Prentice Hall, prior to Jun. 11, 2010.

Stillman et al., "A System for Tracking and Recognizing Multiple People with Multiple Cameras," 6 pages, Aug. 1998.

Sun et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

U.S. Appl. No. 13/077,821, filed Mar. 30 2011.

Freeboy, "Adaptive Optics Speeds Up Airport Immigration," Optics. org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

* cited by examiner

MODULAR BIOMETRICS COLLECTION SYSTEM ARCHITECTURE

This application claims the benefit of U.S. Provisional Application No. 60/778,770, filed Mar. 3, 2006.

The government may have rights in the present invention.

BACKGROUND

The present invention pertains to recognition systems and particularly to biometric recognition systems. More particularly, the invention may pertain to collection architecture of the recognition systems.

U.S. patent application Ser. No. 10/979,129, filed Nov. 3, 2004, is hereby incorporated by reference.

U.S. patent application Ser. No. 10/655,124, filed Sep. 5, 2003, is hereby incorporated by reference.

U.S. patent application Ser. No. 11/382,373, filed May 9, 2006, is hereby incorporated by reference.

U.S. Provisional Application No. 60/778,770, filed Mar. 3, 2006, is hereby incorporated by reference.

U.S. patent application Ser. No. 11/275,703, filed Jan. 25, 2006, is hereby incorporated by reference.

U.S. Provisional Application No. 60/647,270, filed Jan. 26, 2005, is hereby incorporated by reference.

U.S. patent application Ser. No. 11/043,366, filed Jan. 26, 2005, is hereby incorporated by reference.

U.S. patent application Ser. No. 11/372,854, filed Mar. 10, 2006, is hereby incorporated by reference.

U.S. patent application Ser. No. 11/672,108, filed Feb. 7, 2007, is hereby incorporated by reference.

U.S. patent application Ser. No. 11/675,424, filed Feb. 15, 2007 is hereby incorporated by reference.

SUMMARY

The present invention is modular biometrics collection system architecture applicable to system such as sensing and acquisition systems.

DESCRIPTION

The present system architecture may relate to biometrics, iris recognition systems, image quality metrics, authentication, access control, monitoring, identification, and security and surveillance systems.

A biometric information acquisition system that incorporates multiple acquisition components, maximizing the amount and quality of the collected content, should be very flexible and adaptive, allowing essentially any collected content to influence the collection behavior of any collection component. A conventional design approach for this kind of system may be to perform an extensive static analysis a priori, and design an architecture and system organization for implementing the analysis results. This more generalized information acquisition problem space may be better suited for a collaborative architecture that exhibits local autonomy and federated behavior.

The present system may be constructed as a self-organizing mesh of collaborative independent components. Each component may have inputs, outputs, and local prioritization/management. An input may be physical such as a sensor or content produced by another component. An output may be content that could be used as input to another component or a physical surface such as a display. The local prioritization may determine how and/or when inputs are used. Then operations may be performed and outputs produced based on locally relevant evaluation of local values and evaluation of external values received as inputs. Inputs and outputs may be shared using a producer/consumer paradigm. That is, the producer of outputs may have no knowledge of the number of consumers or how the outputs will be used, and the consumer may subscribe to content abstractly by a content identifier and quality of service, potentially without knowledge of the producer. Each component may operate autonomously, acting on its inputs upon their arrival and producing outputs from them as dictated by its own prioritization. Federated behavior may be achieved incorporating a component of larger scope that subscribes to content produced by smaller scope components, and produces guidance content that the small scope components may subscribe to and use to influence their local prioritization.

One may analyze a problem space. The system may be partitioned into components identified by inputs, outputs, and independence from other components, and general reusability of defined content. Content may be defined using an abstraction applicable to a broad application scope.

One may identify types of information needed for collaboration guidance that might not otherwise be produced in the system, identify candidate producers, and define as produced content.

One may define identification, characteristics, and interchange encoding for each type of content. To the extent feasible, use content descriptions that already exist, or add backward compatible extensions to existing content definitions, to permit newer producers to be used with existing systems.

A coordinate system may be utilized that is relative within the immediate scope. For example, information within a zone may be exchanged in zone scoped rectangular coordinates. An aiming component within a zone may be configured to know its location and orientation, and it can determine how to aim from zone coordinates. Information within a site may be exchanged in site scoped rectangular coordinates, and any entity exchanging information outside its zone must know the zone's site location and orientation, and perform the coordinate scoping transformation. The parameters necessary to make these transformations must be available from the next level up in the hierarchy.

Figure 1:
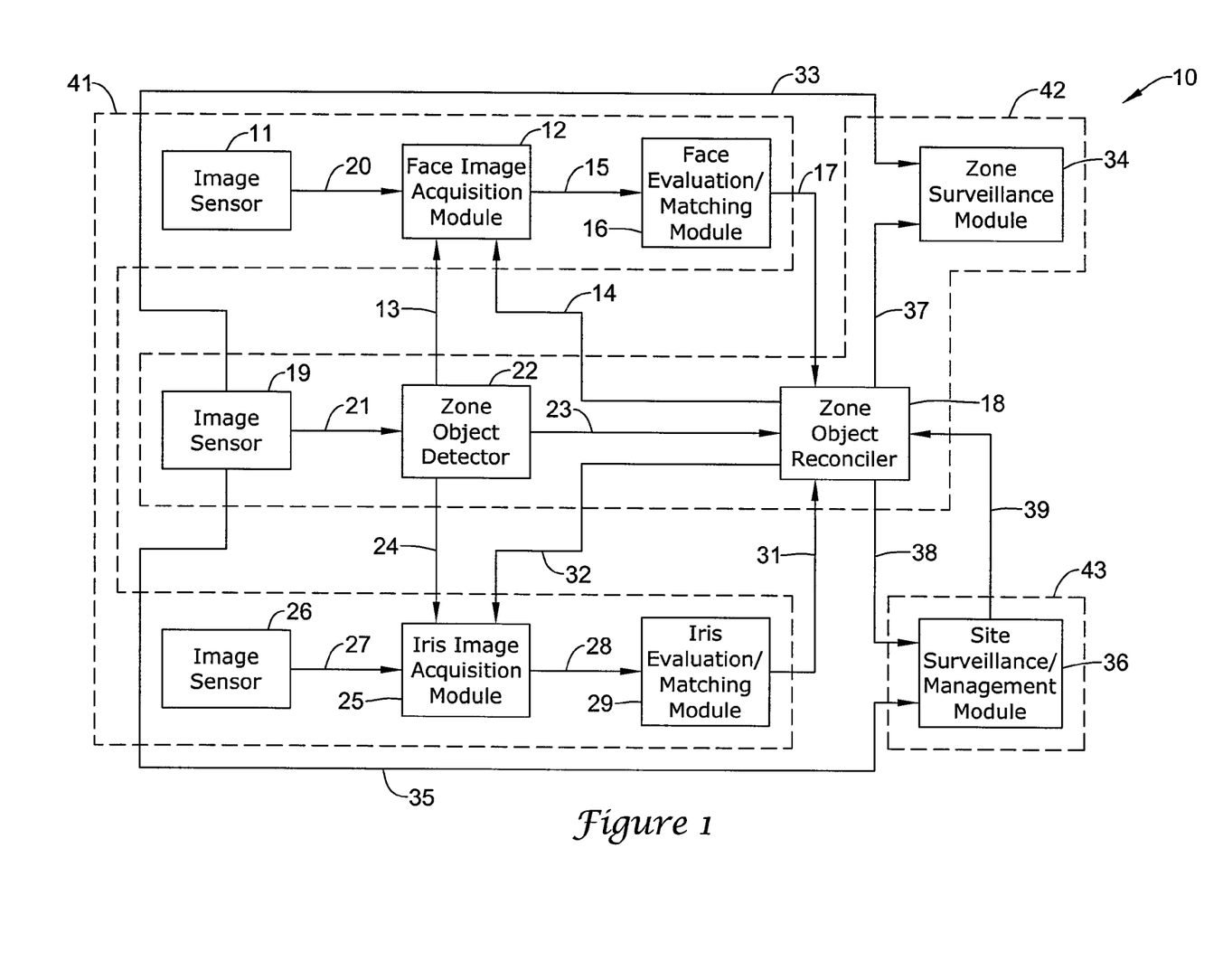
FIG. 1 is a diagram of an example system utilizing biometrics collection system architecture.

For description purposes, one may consider a multiple biometric system acquiring both face and iris recognition biometrics from fields of view, or zones (see FIG. 1). This system may operate at three levels—a site level, a zone level, and a biometrics level.

At the site level may be surveillance and/or management entities that serve as aggregators of multiple zones. For an example system, a site surveillance module may typically subscribe to zone images, and reconcile match results (i.e., matched) to present an overview of the scene activities, but when "zooming in", it could temporarily subscribe to any content to present a detailed view of the current zone state/activity. The site management module may subscribe to reconciled match results, and provide functionality such as coordination across multiple zones. The coordination may be materialized as prioritizing guidance content.

At the zone level, a zone object detector may identify and publish coordinates of objects of interest, using the same identifier for objects that are likely-to-be the same entity, and the zone object reconciler may fuse biometric content taking object identifiers into account. The results may be published as reconciled match results.

At the biometrics level, acquisition and evaluation/matching modules may obtain suitable quality images from the coordinates specified with objects in zone, perform matching, and publish the evaluation and match results. These modules or components may operate autonomously, prioritizing the objects in the zone to optimize the number and quality of biometrics as appropriate for the current set of detected objects in the scene. External content including reconciled match results and prioritizing guidance may be factored into the prioritization.

An example biometric system may produce/consume multiple kinds of content. There may be camera and/or sensor inputs. There may be a zone image which is an image of a region being observed. There may be objects in a zone which can have coordinates and the size of a region in a zone image identified as being of interest. A face image may be correlated to a zone object. There may be an image having an object which can be identified as a face of sufficient quality for recognition at object coordinates. Face match results may be a report on results of a matching operation using a specified face image. An iris image may be correlated to zone object. It may be an image identified as an iris of sufficient quality for recognition at object coordinates. Iris match results may be a report on results of a matching operation using a specified iris image. Reconciled match results may be an assessment of identification and relationship between biometric artifacts with respect to objects in a zone. Prioritizing guidance may be information from a larger scope of the system intended to influence local prioritization of potential objects in a zone.

The example system may have various components, modules, and/or the like. There may be a zone object detector which has an input from a camera sensor. Its activity may include collecting images of the zone, analyzing the images, and identifying objects of interest. An identification (ID) may be assigned to each new object. The output content may include zone image and object information. There may be face image acquisition which has inputs of a camera sensor, objects in a zone, reconciled match results, and prioritizing guidance. Its activity may include prioritizing known objects, zooming to a face at object coordinates, and obtaining a sufficient quality image for a face match. Its output content may include a face image correlated to a zone.

There may be iris image acquisition having inputs of a camera sensor, objects in a zone, reconciled match results, and prioritizing guidance. Its activity may include prioritizing known objects, zooming to a face (iris) at object coordinates, and obtaining a sufficient quality image for an iris match. Its output content may include face biometric data correlated to a zone object. There may be face evaluation/matching having an input of face biometric data correlated to a zone object. Its activity may include processing the biometric data to extract recognition criteria (biometric artifact) and looking up a face biometric artifact in a recognition database. Its output content may include biometric artifacts and face match results. There may be iris matching having an input of an iris biometric data correlated to a zone object. Its activity may include processing the biometric data to extract recognition criteria (biometric artifact) and looking up an iris biometric artifact in a recognition database. Its output content may include iris match results.

There may be a zone object reconciler having inputs of objects in a zone, face match results, and iris match results. Its activity may include analyzing match results, matching conflicts, using affinity measures to resolve conflicts, auto enrolling as appropriate, and so forth. Its output content may include biometric artifacts, multi-biometric match results and image acquisition guidance.

There may be zone surveillance having input content selected for display such as zone images, biometric artifacts, and multi-biometric match results. Its activity may include displaying a zone image, match results, and so forth, as appropriate for the zone scope of an observation. Its output may include visual display. There may be site surveillance/management having input content from multiple zones selected for display such as zone images and reconciled match results. Its activity may include displaying multiple individual/consolidated zone images, match results, and so forth, as appropriate for the site scope of observation. Its output may include visual display and prioritizing guidance (to zone scope).

A collection system may have a biometric scope, a zone scope and a site scope. The zone scope may produce guidance content for the biometric scope and consume content produced by the biometric scope. The site scope may produce guidance content for the zone scope and consume content produced by the zone scope. The biometric scope may have a sensing module, an acquisition module that consumes content produced by the sensing module, and an evaluation module that consumes content produced by the acquisition module.

FIG. 1 shows an example system 10 implementing the present system architecture. An image sensor 11 may output an image to a face image acquisition module 12. The image may have a face which is acquired by module 12. Known objects may be prioritized by module 12. The face at object coordinates may be zoomed to by the module. A sufficient quality image for a match may be obtained. The image may be correlated and published. Input 13 content may include objects in a zone. Input 14 content may include reconciled match results and prioritizing guidance. An output 15 may have content of a face biometric data correlated to a zone object. Output 15 may go to a face evaluation/matching module 16. Module 16 may extract a face biometric artifact from the biometric data and look up the face biometric artifact in a recognition database. Biometric artifact and face match results may be published as content in an input 17 to a zone object reconciler 18.

An image sensor 19 may provide images 21 of its visible region to a zone object detector 22. Detector 22 may receive images 21, analyze them, and identify objects of interest. An identification label (ID) may be assigned to each new object. The zone image and object information may be published by the detector 22. Content of output 23 from detector 22 may include information locating objects in the zone which may go to reconciler 18. The same content may be provided as the input 13 to the face image acquisition module 12. Also, this content may be provided as an input 24 to an iris image acquisition module 25.

An image sensor 26 may provide images 27 of a face including images of an eye and iris to the iris image acquisition module 25. Module 25 may prioritize known objects, zoom to the face at object coordinates, obtain a sufficient quality image for a match and produce a correlated image as biometric data content. The content of an output 28 as an input to an iris evaluation/matching module 29 may include iris biometric data correlated to a zone object. The iris matching module 29 may extract an iris biometric artifact from the biometric data and look up the iris biometric artifact in a recognition database and produce the iris match results. An output 31 of module 29 may provide iris biometric artifacts and iris match results as content to the zone object reconciler 18. Reconciler 18 may provide an output as an input 32 having multi-biometric match results and prioritizing guidance as content to the iris image acquisition module 25.

Image sensor 19 may provide zone image content as an input 33 to a zone surveillance module 34 and as an input 35 to a site surveillance/management module 36. The zone object reconciler 18 may provide reconciled match results as content for an input 37 to the zone surveillance module 34 and for an input 38 to the site surveillance/management module 36. Module 36 may be a site of numerous zones, for example, zones A, B, C, D, E, F, G, H, and so on. These zones may be areas of surveillance, for instance. Content from site scope module 36 may consist of prioritizing guidance which is an input 39 to the zone object reconciler 18.

The zone surveillance module 34 may have a display output. A zone image may be displayed, match results, and so forth, as appropriate for the present scope of observation.

System 10 may have a biometric scope 41, a zone scope 42 and a site scope 43, which could be modules. Biometric scope 41 may be interactively connected to zone scope 42. Zone scope 42 may be interactively connected to site scope 43. Image sensor 11, face acquisition module 12, face matching module 16, image sensor 26, iris image acquisition module 25 and iris matching module 29 may be of the biometric scope 41. Image sensor 19, zone object detector 22, zone object reconciler 18 and zone surveillance module 34 may be of the zone scope 42. Site surveillance/management module 36 may be of the site scope 43. Modules may be at various levels.

Figure 2:
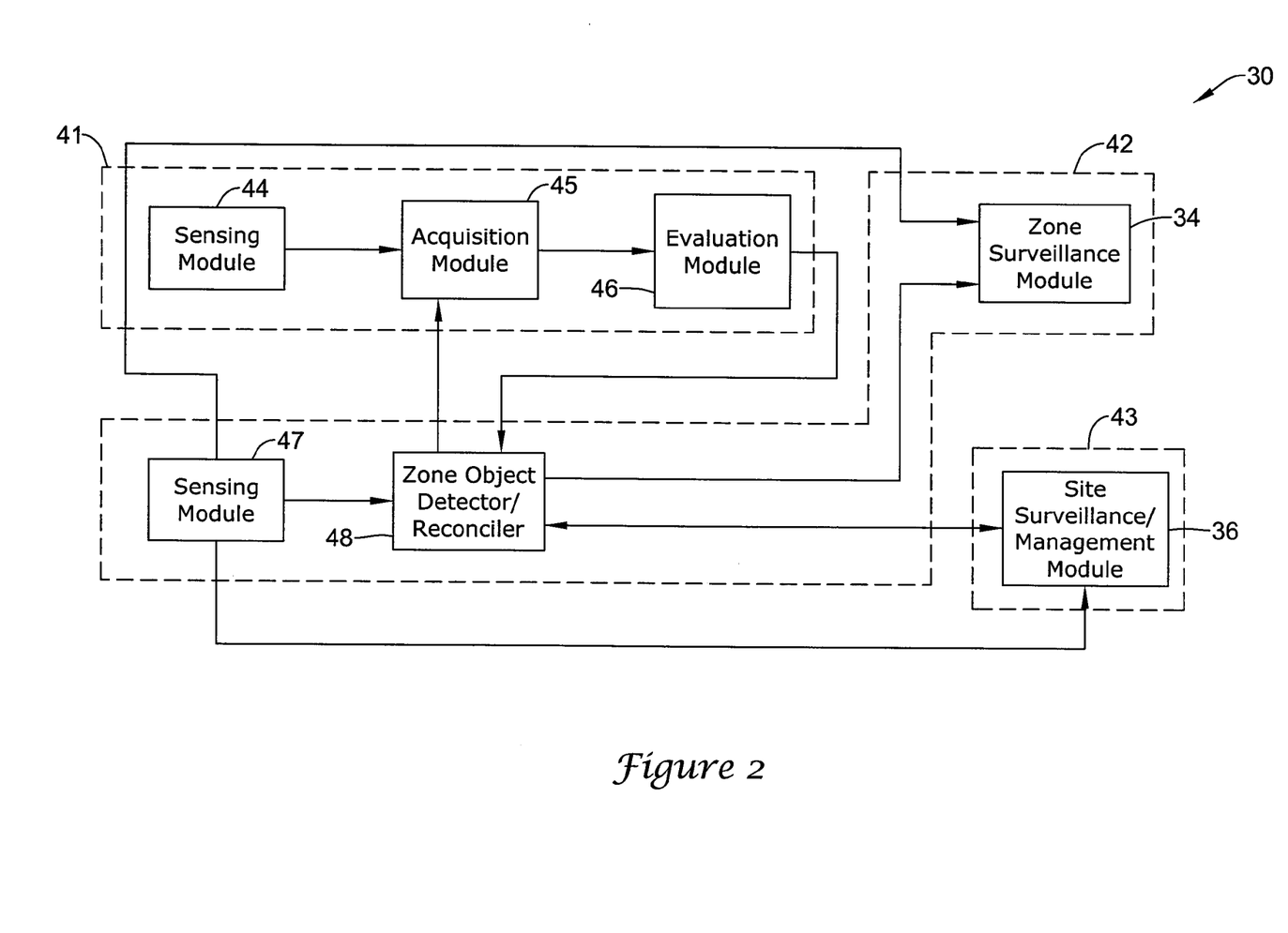
FIG. 2 is a diagram of a different scale system than the system in the diagram of FIG. 1, having fewer biometrics sensors.

FIG. 2 is a diagram of a system 30 which may be a more general level instantiation of the present invention then the diagram of FIG. 1. A sensing module 44 may be connected to an acquisition module 45. The acquisition module 45 may be connected to an evaluation module 46. A biometric scope 41 may include modules 44, 45 and 46. A sensing module 47 may be connected to a zone object detector/reconciler 48 and to a zone surveillance module 34. The zone object detector/reconciler 48 may be connected to the acquisition module 45, the evaluation module 46 and the zone surveillance module 34. A zone scope may include sensing module 47, zone object detector/reconciler 48 and zone surveillance module 34. A site surveillance/management module 36 may be connected to the sensing module 47 and the zone object detector/reconciler 48. A site scope 43 may include the site surveillance/management module 36.

Sensing module 44 may have one or more image or other sensors for detecting various kinds of items such as people, animals, inanimate objects, and features of those people, animals, inanimate objects, and so forth. The acquisition module 45 may acquire or extract features, activities, and/or patterns of activities, of the sensed items. The evaluation module 46 may provide such things as matching, grading, thresholding, and so forth, of those items of module 45. Sensing module 47 may provide one or more images or have other sensors to detect various items like those detected by module 44. The zone object detector/reconciler 48 may include a zone object detector and a zone object reconciler, which may be similar, but not necessarily, to the detector 22 and reconciler 18 of FIG. 1, respectively.

Figure 3:
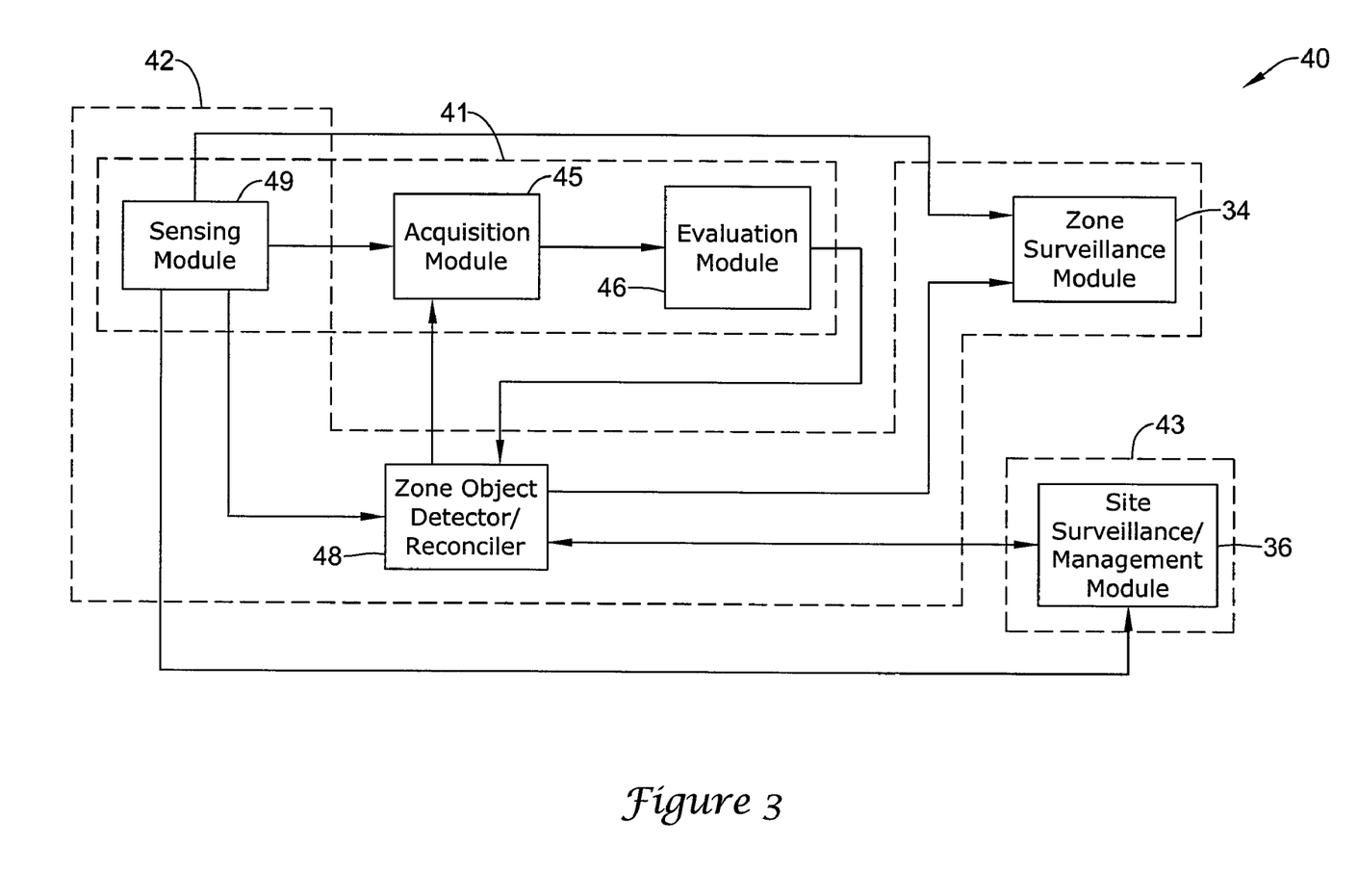
FIG. 3 is a diagram of a system in which multiple system scopes utilize a common sensor as compared to the system in the diagram of FIG. 2.

FIG. 3 is a diagram of a system 40 which is similar to system 30. Biometric scope 41 may overlap zone scope 42. A reason for an overlay is that the operations, functions, mechanism and the like of modules 44 and 47 may be combined into a sensing module 49.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A collection system, comprising:
   an object detector for collecting a plurality of images of a full field of view, for analyzing the collected plurality of images, for identifying objects of interest in the analyzed plurality of images, for publishing the plurality of images, and for publishing respective coordinates in each image for each of the identified objects;
   a face image extractor for receiving the published plurality of images and the respective coordinates in each image for each of the identified objects, for recognizing at least one identified object as a face, for zooming into the published plurality of images at the respective coordinates to the face, and for publishing a zoomed image of the face as a published face image;
   a face image identifier for receiving the published face image, for determining if the published face image is present in a face image database, and for publishing a face identity result that indicates the identity of the face if the published face image is present in the face image database;
   an iris image extractor for receiving the published plurality of images and the respective coordinates in each image for each of the identified objects, for recognizing at least one identified object as an iris, for zooming into the published plurality of images at the respective coordinates to the iris, and for publishing a zoomed image of the iris as a published iris image;
   an iris image identifier for receiving the published iris image, for determining if the published iris image is present in an iris image database, and for publishing an iris identity result that indicates the identity of the iris if the published iris image is present in the iris image database; and
   a reconciler for receiving the published plurality of images, the published respective coordinates in each image for each of the identified objects, the published face identity result and the published iris identity result, for matching at least one of the face and iris identity results to a respective identified object, and for publishing a person identity.

2. The collection system of claim 1, wherein the object detector, the face image extractor, the face image identifier, the iris image extractor, the iris image identifier and the reconciler run independently of each other.

3. The collection system of claim 1, wherein the reconciler further receives multiple pluralities of images, each plurality originating from a different sensor, each sensor having its own full field of view.

4. The collection system of claim 1, wherein the face image extractor and the iris image extractor both further receive multiple pluralities of images, each plurality originating from a different sensor, each sensor having its own full field of view.

5. The collection system of claim 1, wherein the zoom of the face image extractor is different from the zoom of the iris image extractor.

6. The collection system of claim 1, wherein the zooms of the face and iris image extractors comprise selecting a portion of image pixels from the respective image of the full field of view.

7. The collection system of claim 1, wherein all the images in the collected plurality of images are produced by a stationary sensor and use the same coordinate system.

8. The collection system of claim 1,
wherein at least some of the images in the collected plurality of images are produced by a moving sensor; and
wherein at least some of the images in the collected plurality of images cover a moving full field of view.

9. The collection system of claim 8, wherein the published respective coordinates in each image for each of the identified objects accounts for the movement of the sensor and the moving full field of view.

10. A collection method, comprising:
collecting a plurality of images of a full field of view;
analyzing the collected plurality of images;
identifying objects of interest in the analyzed plurality of images;
publishing the plurality of images;
publishing respective coordinates in each image for each of the identified objects;
receiving the published plurality of images and the respective coordinates in each image for each of the identified objects;
recognizing at least one identified object as a face;
zooming into the published plurality of images at the respective coordinates to the face;
publishing a zoomed image of the face as a published face image;
receiving the published face image;
determining if the published face image is present in a face image database;
publishing a face identity result that indicates the identity of the face if the published face image is present in the face image database;
receiving the published plurality of images and the respective coordinates in each image for each of the identified objects;
recognizing at least one identified object as an iris;
zooming into the published plurality of images at the respective coordinates to the iris;
publishing a zoomed image of the iris as a published iris image;
receiving the published iris image;
determining if the published iris image is present in an iris image database;
publishing an iris identity result that indicates the identity of the iris if the published iris image is present in the iris image database;
receiving the published plurality of images, the published respective coordinates in each image for each of the identified objects, the published face identity result and the published iris identity result;
matching at least one of the face and iris identity results to a respective identified object; and
publishing a person identity.

11. The collection method of claim 10, further comprising receiving multiple pluralities of images, each plurality originating from a different sensor, each sensor having its own full field of view.

12. The collection method of claim 10, wherein the zooms are different for the face and iris resolutions.

13. The collection method of claim 10, wherein the zooms comprise selecting a portion of image pixels from the respective image of the full field of view.

14. The collection method of claim 10, wherein all the images in the collected plurality of images are produced by a stationary sensor and use the same coordinate system.

15. The collection method of claim 10,
wherein at least some of the images in the collected plurality of images are produced by a moving sensor; and
wherein at least some of the images in the collected plurality of images cover a moving full field of view.

16. The collection method of claim 15, wherein the published respective coordinates in each image for each of the identified objects accounts for the movement of the sensor and the moving full field of view.

* * * * *